United States Patent
Makimura

(10) Patent No.: US 12,177,711 B2
(45) Date of Patent: Dec. 24, 2024

(54) CONTROL DEVICE, AND CONTROL METHOD FOR TRANSMITTING A VOICE SIGNAL TO BASE STATIONS WHEN A BRANCH POINT IS DETECTED

(71) Applicant: Mitsubishi Electric Corporation, Tokyo (JP)

(72) Inventor: Yuji Makimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 356 days.

(21) Appl. No.: 17/772,541

(22) PCT Filed: Dec. 11, 2019

(86) PCT No.: PCT/JP2019/048389
§ 371 (c)(1),
(2) Date: Apr. 28, 2022

(87) PCT Pub. No.: WO2021/117151
PCT Pub. Date: Jun. 17, 2021

(65) Prior Publication Data
US 2022/0377593 A1 Nov. 24, 2022

(51) Int. Cl.
*H04W 28/02* (2009.01)
*H04W 4/42* (2018.01)
(Continued)

(52) U.S. Cl.
CPC ......... *H04W 28/0226* (2013.01); *H04W 4/42* (2018.02); *H04W 16/14* (2013.01); *H04W 28/021* (2013.01); *H04W 36/08* (2013.01)

(58) Field of Classification Search
CPC ... H04W 28/0226; H04W 4/42; H04W 16/14; H04W 28/021; H04W 36/08;
(Continued)

(56) References Cited

U.S. PATENT DOCUMENTS

| 2011/0312369 A1* | 12/2011 | Furuya | H04W 36/08 455/525 |
| 2016/0173174 A1* | 6/2016 | Park | H04W 24/10 370/329 |

(Continued)

FOREIGN PATENT DOCUMENTS

| JP | 3424910 B2 | 7/2003 |
| JP | 2007-324635 A | 12/2007 |
| JP | 4632883 B2 | 2/2011 |

OTHER PUBLICATIONS

International Search Report and Written Opinion mailed on Feb. 25, 2020, received for PCT Application PCT/JP2019/048389, Filed on Dec. 11, 2019, 8 pages including English Translation.

*Primary Examiner* — Rushil P. Sampat
(74) *Attorney, Agent, or Firm* — XSENSUS LLP

(57) ABSTRACT

A control device communicates with a mobile station installed in a train, existing in a base station zone as a reception area of a signal transmitted from a base station and traveling on a railroad, via the base station. The control device includes an acquisition unit that acquires branch information indicating that a branch point on the railroad exists in the base station zone and information indicating base stations existing one base station ahead of the base station and a control unit that transmits the same voice signal to the base station and the base stations when existence of the branch point in the base station zone is detected based on the branch information.

6 Claims, 15 Drawing Sheets

(51) Int. Cl.
*H04W 16/14* (2009.01)
*H04W 36/08* (2009.01)

(58) Field of Classification Search
CPC ...... B61L 15/0058; B61L 23/18; B61L 3/006; B61L 15/0027; B61L 15/0072; B61L 25/025; B61L 27/20; B61L 27/40; B61L 3/16; B61L 2205/02; B61B 1/02
See application file for complete search history.

(56) References Cited

U.S. PATENT DOCUMENTS

| | | | |
|---|---|---|---|
| 2018/0048400 A1* | 2/2018 | Kojima | H04B 17/10 |
| 2019/0077426 A1* | 3/2019 | Nishi | B61L 15/0027 |
| 2020/0086901 A1* | 3/2020 | Kojima | B61L 23/34 |

* cited by examiner

| EXISTENCE TABLE | |
|---|---|
| BASE STATION | TRAVELING DIRECTION |
| BASE STATION B | DOWN LINE |

FIG. 12

| BASE STATION A | BASE STATION B | BASE STATION C | BASE STATION D | BASE STATION E | BASE STATION F |
|---|---|---|---|---|---|
| × | ○ | □ | × | | |
| | | | BASE STATION G | BASE STATION H | BASE STATION I |
| | | | × | | |

○ : PRESENT POSITION

□ : MULTICAST

× : CLOSURE

FIG. 14

| BASE STATION A | BASE STATION B | BASE STATION C | BASE STATION D | BASE STATION E | BASE STATION F |
|---|---|---|---|---|---|
|  | × | ○ | □ | × |  |
|  |  |  | BASE STATION G | BASE STATION H | BASE STATION I |
|  |  |  | □ | × |  |

○ : PRESENT POSITION

□ : MULTICAST

× : CLOSURE

CONTROL DEVICE, AND CONTROL METHOD FOR TRANSMITTING A VOICE SIGNAL TO BASE STATIONS WHEN A BRANCH POINT IS DETECTED

CROSS-REFERENCE TO RELATED APPLICATION

The present application is based on PCT filing PCT/JP2019/048389, filed Dec. 11, 2019, the entire contents of which are incorporated herein by reference.

TECHNICAL FIELD

The present disclosure relates to a control device, and a control method.

BACKGROUND ART

A communication system includes a central station as a command center and a plurality of base stations installed along a railroad. The central station and the plurality of base stations are connected to each other by a tree-shaped network. A train is provided with a mobile station. The mobile station communicates with the central station via a base station along the railroad. This implements voice communication between the driver or conductor of the train and a dispatcher at the command center.

When the train moves from an area of a certain base station into an area of a base station in a traveling direction (i.e., ahead), the mobile station switches the communication destination from the base station currently communicating with to the base station in the traveling direction in order to continue the voice communication with the central station. The switching process is referred to as handover. The area of a base station will hereinafter be referred to as a "base station zone".

Further, the central station reserves radio channels so as to prevent an overlap between a radio channel used by a mobile station for voice communication and a radio channel used for voice communication of another mobile station. The process of the reservation is referred to as closure.

Due to high-speed movement of the train, there is a momentary interruption in the communication between the mobile station and the central station at the time of the handover. This causes interruption of sound. So, there has been proposed a technology for shortening the time of the sound interruption (see Patent Reference 1). For example, a router described in the Patent Reference 1 multicasts data to a base station of a base station zone in which the train exists and a base station of a base station zone that the train enters next.

PRIOR ART REFERENCE

Patent Reference

Patent Reference 1: Japanese Patent Application Publication No. 2007-324635

SUMMARY OF THE INVENTION

Problem to be Solved by the Invention

Incidentally, when there exists a branch point ahead, the train travels on one of railroads ahead of the branch point. When the aforementioned technology is carried out, information indicating on which railroad the train travels at a branch point is necessary. Since the train schedule changes from day to day, a device carrying out the aforementioned technology does not store the information. On the other hand, the train stores the information. Thus, it is possible to employ a method of previously acquiring the information from the train each time the device carries out the aforementioned technology. However, there can be cases where the device cannot acquire the information from the train for some reason. Further, there can also be cases where the device acquires the information in a partially damaged condition. In such cases, the device cannot carry out the aforementioned technology.

An object of the present disclosure is to shorten the time of the sound interruption.

Means for Solving the Problem

A control device according to an aspect of the present disclosure is provided. The control device communicates with a communication device installed in a train, existing in a first base station zone as a reception area of a signal transmitted from a first base station and traveling on a railroad, via the first base station. The control device includes an acquisition unit that acquires branch information indicating that a branch point on the railroad exists in the first base station zone and information indicating a plurality of base stations existing one base station ahead of the first base station and a control unit that transmits a same voice signal to the first base station and the plurality of base stations when existence of the branch point in the first base station zone is detected based on the branch information.

Effect of the Invention

According to the present disclosure, the time of the sound interruption can be shortened.

BRIEF DESCRIPTION OF THE DRAWINGS

FIG. 12 is a diagram (No. 1) showing conditions of base stations.

FIG. 14 is a diagram (No. 2) showing conditions of the base stations.

MODE FOR CARRYING OUT THE INVENTION

An embodiment will be described below with reference to the drawings. The following embodiment is just an example and a variety of modifications are possible within the scope of the present disclosure.

Embodiment

Figure 1:
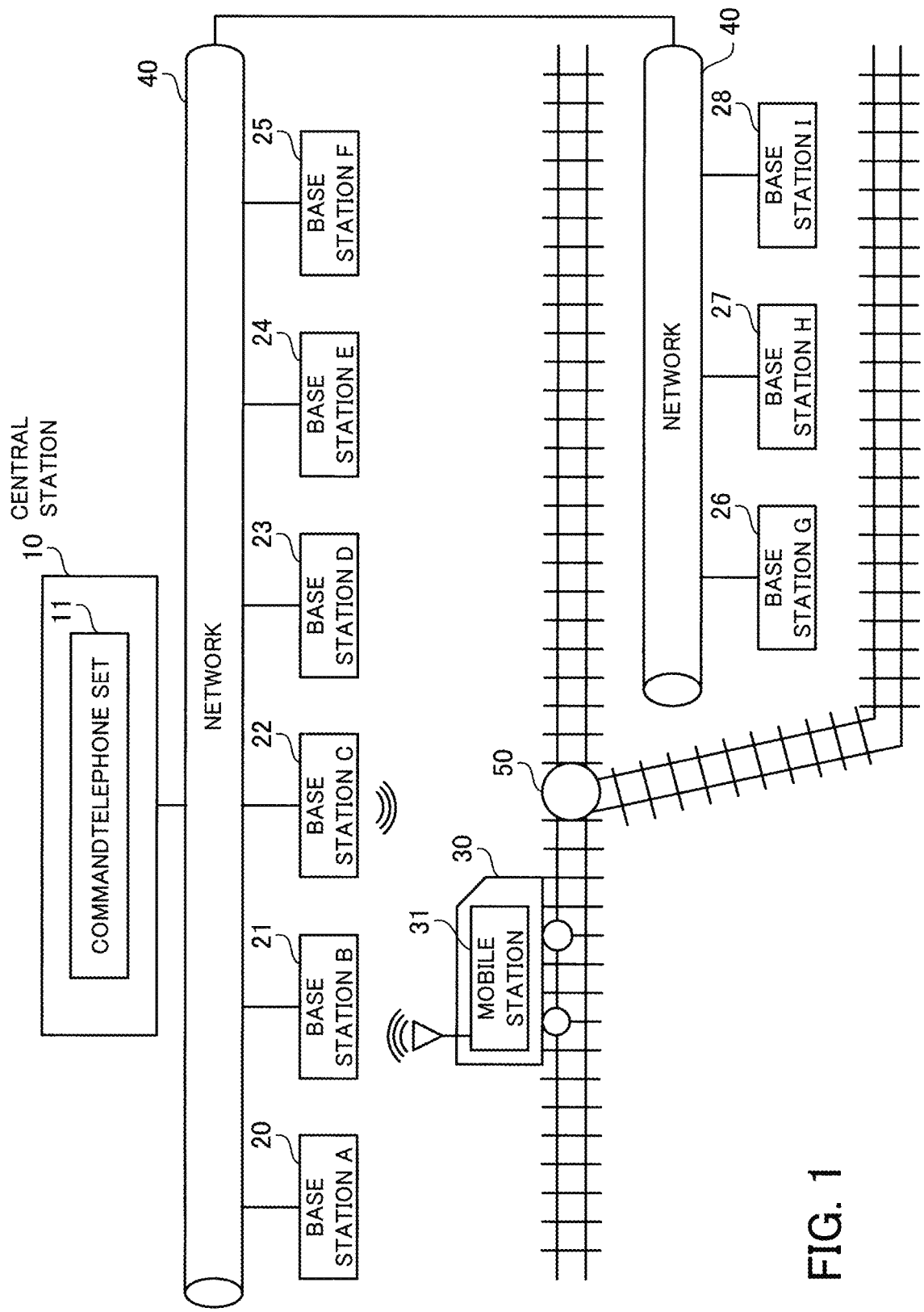
FIG. 1 is a diagram showing a communication system.

FIG. 1 is a diagram showing a communication system. The communication system includes a central station 10, base stations 20 to 28, and a mobile station 31 installed in a train 30.

The central station 10 and the base stations 20 to 28 are connected to each other via a network 40. The central station. 10 and the mobile station 31 are capable of connecting with each other via a base station among the base stations 20 to 28.

A command telephone set 11 is installed in the central station 10. The command telephone set 11 is used by a dispatcher.

The base station 20 is referred to also as a base station A. The base station 21 is referred to also as a base station B. The base station 22 is referred to also as a base station C. The base station 23 is referred to also as a base station D. The base station 24 is referred to also as a base station E. The base station 25 is referred to also as a base station F. The base station 26 is referred to also as a base station G. The base station 27 is referred to also as a base station H. The base station 28 is referred to also as a base station I.

The train 30 travels on a railroad. The mobile station 31 is referred to also as a communication device. FIG. 1 indicates a branch point 50 existing on the railroad.

Figure 2:
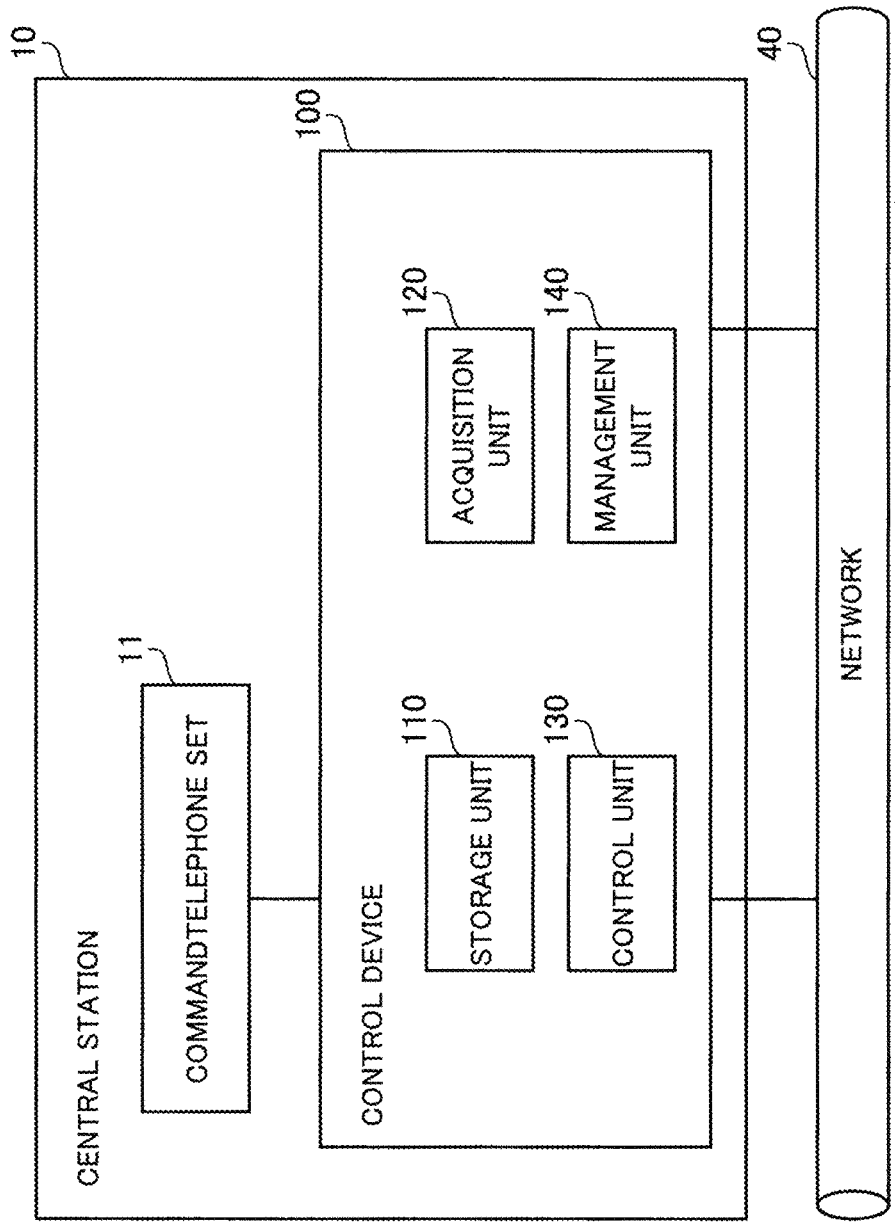
FIG. 2 is a diagram showing an example of a central station.

FIG. 2 is a diagram showing an example of the central station. The command telephone set 11 and a control device 100 are installed in the central station 10. The control device 100 is a device that executes a control method.

Here, hardware included in the control device 100 will be described below.

Figures 3, 4:
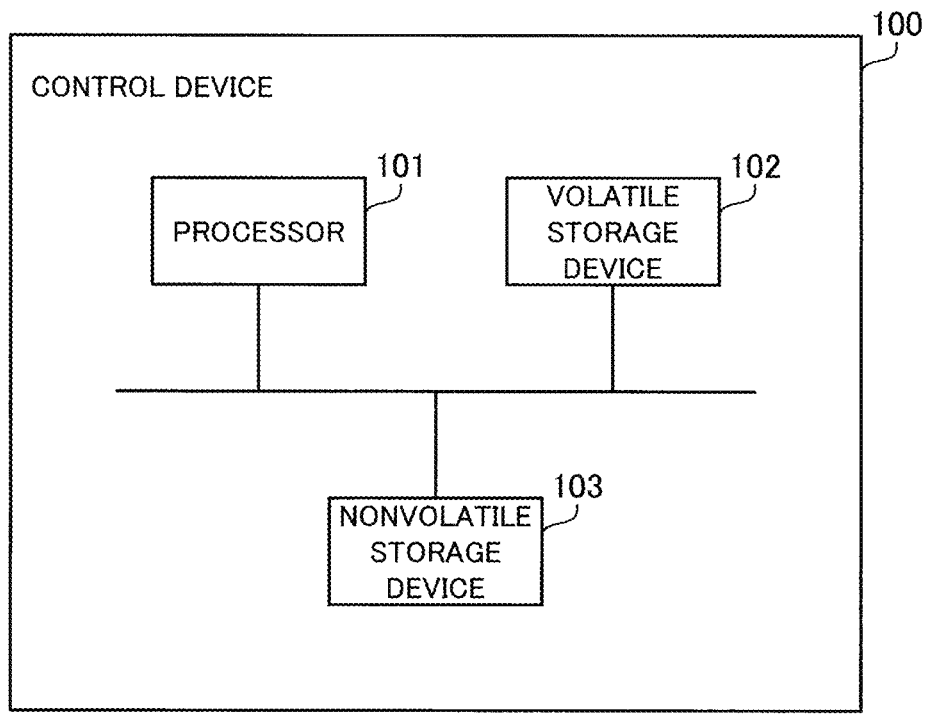
FIG. 3 is a diagram showing the configuration of hardware included in a control device.
FIG. 4 is a diagram showing an example of an existence table.

FIG. 3 is a diagram showing the configuration of the hardware included in the control device. The control device 100 includes a processor 101, a volatile storage device 102 and a nonvolatile storage device 103.

The processor 101 controls the whole of the control device 100. For example, the processor 101 is a Central Processing Unit (CPU), a Field Programmable Gate Array (FPGA) or the like. The processor 101 can also be a multiprocessor. The control device 100 may also be implemented by a processing circuitry or implemented by software, firmware or a combination of software and firmware. Incidentally, the processing circuitry may be either a single circuit or a combined circuit.

The volatile storage device 102 is main storage of the control device 100. The volatile storage device 102 is a Random Access Memory (RAM), for example. The nonvolatile storage device 103 is auxiliary storage of the control device 100. The nonvolatile storage device 103 is a Hard Disk Drive (HDD) or a Solid State Drive (SSD), for example.

Returning to FIG. 2, function of the control device 100 will be described below.

The control device 100 includes a storage unit 110, an acquisition unit 120, a control unit 130 and a management unit 140.

The storage unit 110 may be implemented as a storage area secured in the volatile storage device 102 or the nonvolatile storage device 103.

Part or all of the acquisition unit 120, the control unit 130 and the management unit 140 may be implemented by the processor 101. Part or all of the acquisition unit 120, the control unit 130 and the management unit 140 may be implemented as modules of a program executed by the processor 101. For example, the program executed by the processor 101 is referred to also as a control program. The control program has been recorded in a record medium, for example.

The storage unit 110 stores an existence table and a management table. Here, the existence table and the management table will be described below.

FIG. 4 is a diagram showing an example of the existence table. The existence table 111 is stored in the storage unit 110. The existence table 111 includes items of BASE STATION and TRAVELING DIRECTION. The existence table 111 of FIG. 4 indicates that the mobile station 31 exists in the base station zone of the base station B. Further, the existence table 111 of FIG. 4 indicates that the mobile station 31 is advancing in a down line direction.

Figure 5:
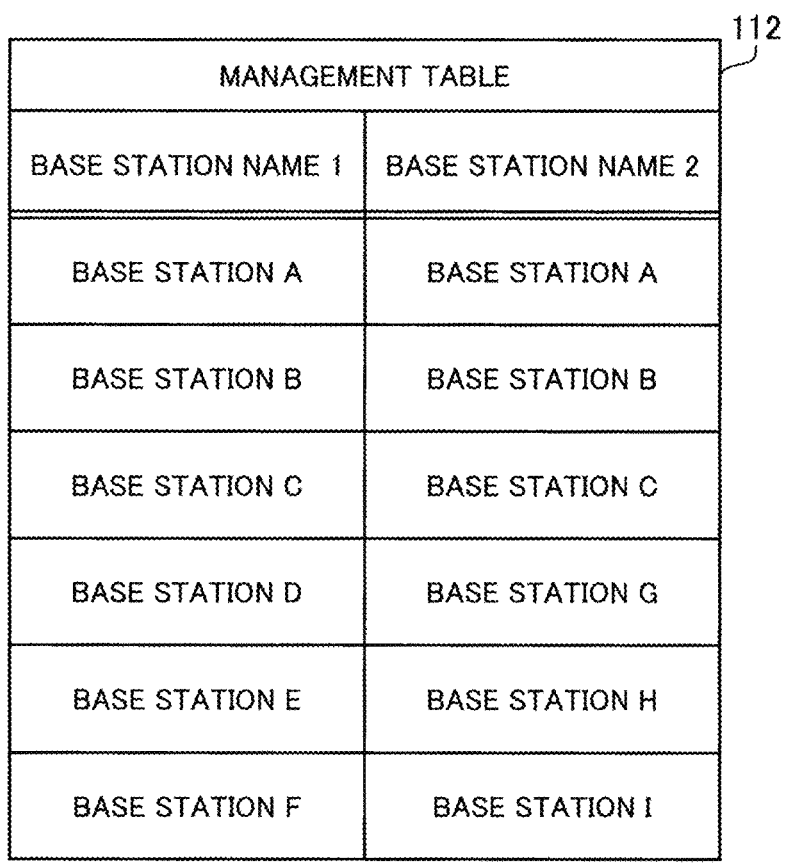
FIG. 5 is a diagram showing an example of a management table.

FIG. 5 is a diagram showing an example of the management table. The management table 112 is stored in the storage unit 110. The management table 112 includes items of BASE STATION NAME 1 and BASE STATION NAME 2. The control unit 130 is capable of identifying a branch point 50 based on the management table 112. For example, the control unit 130 identifies a combination in which the base station registered in the item of BASE STATION NAME 1 and the base station registered in the item of BASE STATION NAME 2 are different from each other. Accordingly, the control unit. 130 identifies the combination of the base station D and the base station G. The control unit 130 identifies a combination immediately above the aforementioned combination. Then, the control unit 130 identifies that the branch point 50 exists in the base station zone of the base station C.

Further, the management table 112 is updated when the number of base stations has increased or decreased.

Returning to FIG. 2, the acquisition unit 120 will be described below.

The acquisition unit 120 acquires branch information indicating that a branch point on the railroad exists in a first base station zone. Further, the acquisition unit 120 acquires information indicating a plurality of base stations existing one base station ahead of a first base station. In other words, the acquisition unit 120 acquires information indicating a plurality of base stations existing in the traveling direction of the train 30 and existing ahead of the branch point.

Here, the first base station is assumed to be the base station 22 (i.e., the base station C), for example. The first base station zone is assumed to be the base station zone of the base station 22. The base station zone of the base station 22 is a reception area of a signal transmitted from the base station 22.

As mentioned earlier, the control unit 130 is capable of identifying that the branch point 50 exists in the base station zone of the base station C by using the management table 112. Thus, it can be said that the branch information is included in the management table 112. Further, the control unit. 130 is capable of identifying a plurality of base stations existing one base station ahead of the base station C by referring to the management table 112. For example, the control unit 130 identifies that the combination in which the base station registered in the item of BASE STATION NAME 1 and the base station registered in the item of BASE STATION NAME 2 are different from each other is the plurality of base stations. Specifically, the control unit 130 identifies that the base station D and the base station G are the plurality of base stations. Thus, it can be said that the management table 112 includes the information indicating a plurality of base stations existing one base station ahead of the first base station. Namely, the acquisition unit 120's acquisition of the management table 112 from the storage unit 110 can be regarded as the acquisition unit 120's acquisition of the branch information and the information indicating a plurality of base stations existing one base station ahead of the first base station.

As mentioned above, the management table 112 includes the branch information and the information indicating a plurality of base stations existing one base station ahead of the first base station. However, the branch information and the information indicating a plurality of base stations existing one base station ahead of the first base station can also exist separately from each other.

Here, the management table 112 may also be stored in an external device. For example, the external device is a cloud server. The acquisition unit 120 may also acquire the management table 112 from the external device.

The control unit 130 is capable of communicating with the base stations 20 to 28. Further the control unit 130 is capable of communicating with the mobile station 31 via one of the base stations 20 to 28. The control unit 130 controls voice communication executed between the command telephone set 11 and the mobile station 31.

Here, for example, the control unit 130 communicates with the mobile station 31 installed in the train 30 existing in the base station zone of the base station 22 via the base station 22. When the existence of the branch point 50 in the base station zone of the base station 22 is detected based on the branch information, the control unit 130 transmits the same voice signal to the base station 22 and the base stations 23 and 26 existing one base station ahead of the base station 22. It is also possible for the control unit 130 to transmit the same voice signal to the base station 22, the base station 23 and the base station 26 at different, times. Incidentally, in the following description, the transmission of the voice signal assumes multicast.

Detailed functions of the control unit 130 will be described later.

The management unit 140 executes communication with the mobile station 31 in succession. Then, the management unit 140 registers information, indicating the base station of the base station zone in which the mobile station 31 exists, in the existence table 111.

Next, a process executed by the control device 100 will be described below by using a flowchart. In this description, a concrete example will be used. In the concrete example, the mobile station 31 is assumed to exist in the base station zone of the base station 21.

Figure 6:
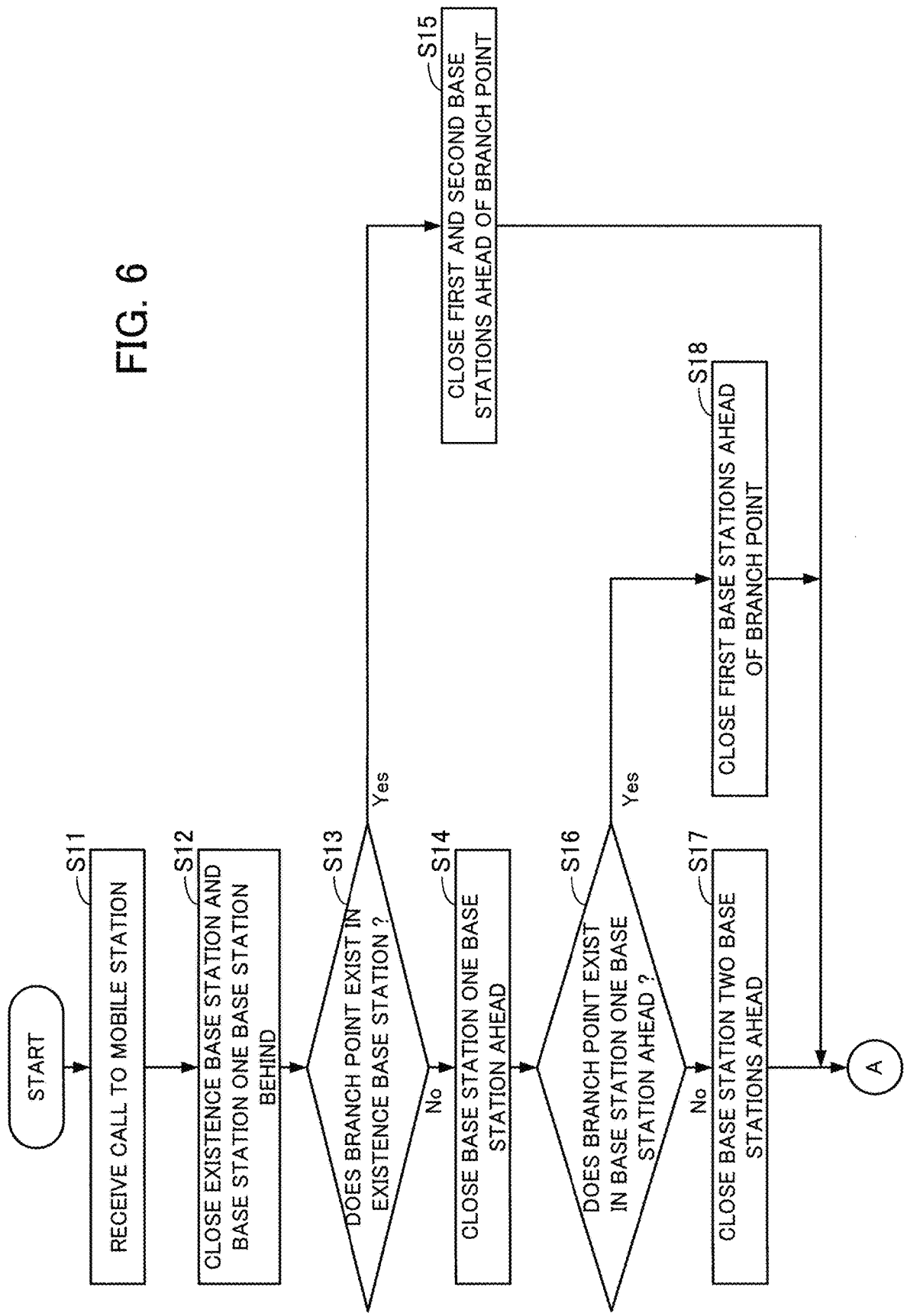
FIG. 6 is a diagram showing a flowchart (No. 1) of a process executed by the control device.

FIG. 6 is a diagram showing a flowchart (No. 1) of the process executed by the control device.

(Step S11) The control, unit 130 receives a call to the mobile station 31 from the command telephone set 11.

(Step S12) The control unit 130 closes a base station of the base station zone in which the mobile station 31 exists and a base station that is one base station behind. For example, the control unit 130 closes the base station 21 of the base station zone in which the mobile station 31 exists and the base station 20 that is one base station behind. The base station of the base station zone in which the mobile station 31 exists is referred to as an existence base station.

(Step S13) The control unit 130 refers to the management table 112 and judges whether or not a branch point exists in the base station zone of the existence base station. When no branch point exists in the base station zone of the existence base station, the control unit 130 advances the process to step S14. When a branch point exists in the base station zone of the existence base station, the control unit 130 advances the process to step S15.

For example, the control unit 130 refers to the management table 112 and judges that no branch point exists in the base station zone of the base station 21. The control unit 130 advances the process to the step S14.

(Step S14) The control unit 130 closes a base station that is one base station ahead. For example, the control unit 130 closes the base station 22.

The control unit 130 advances the process to step S16.

(Step S15) The control unit 130 closes first and second base stations ahead of the branch point. Then, the control unit 130 advances the process to step S21.

(Step S16) The control unit 130 refers to the management table 112 and judges whether or not a branch point exists in the base station zone of the base station that is one base station ahead. When no branch point exists in the base station zone of the base station that is one base station ahead, the control unit 130 advances the process to step S17. When a branch point exists in the base station zone of the base station that is one base station ahead, the control unit 130 advances the process to step S18.

For example, the control unit 130 refers to the management table 112 and judges that the branch point 50 exists in the base station zone of the base station 22. The control unit 130 advances the process to the step S18.

(Step S17) The control unit 130 closes a base station that is two base stations ahead. Then, the control unit 130 advances the process to step S21.

(Step S18) The control unit 130 closes first base stations ahead, of the branch point. For example, the control unit 130 closes the base station 23 and the base station 26.

The control unit 130 advances the process to the step S21.

Figure 7:
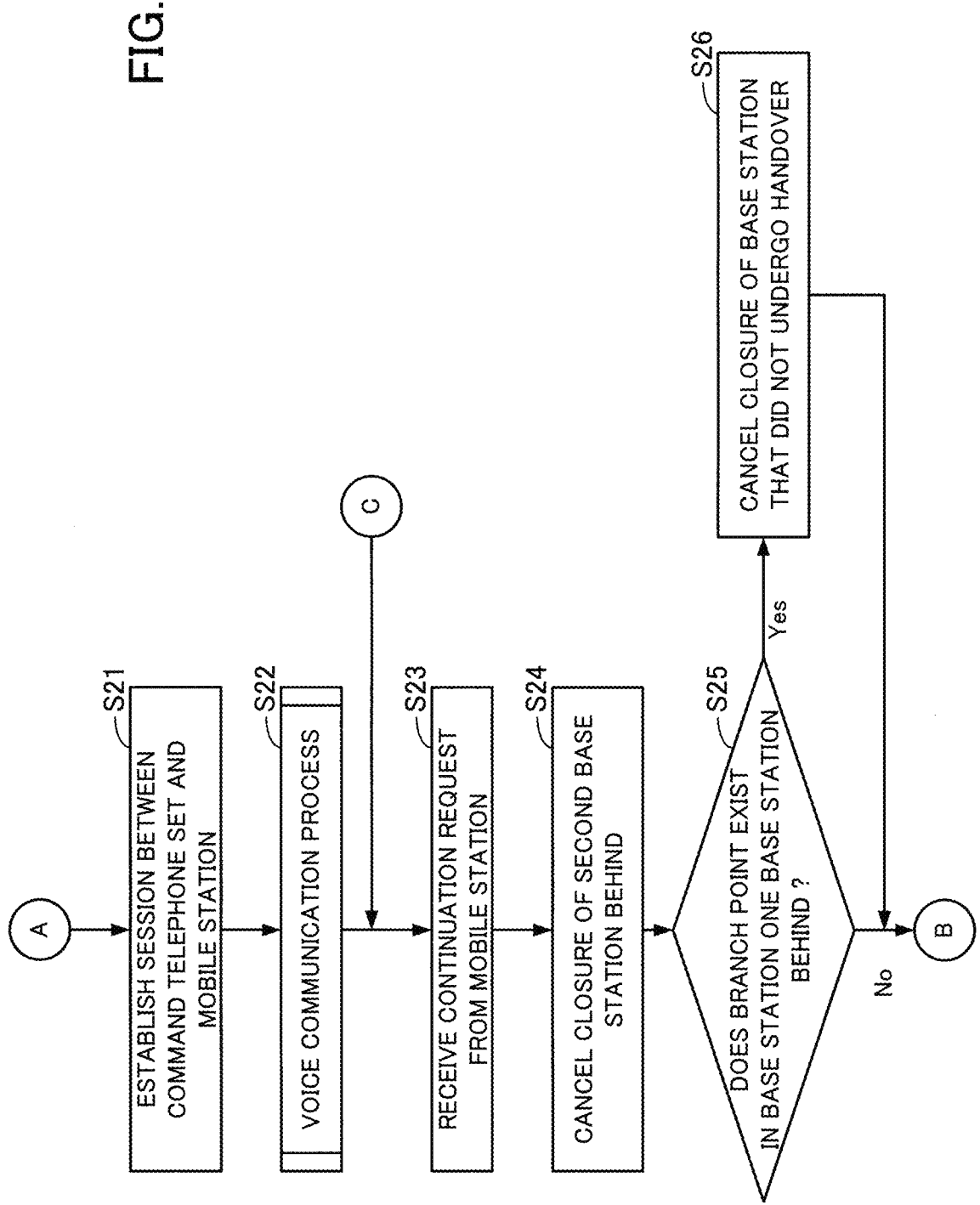
FIG. 7 is a diagram showing a flowchart (No. 2) of the process executed by the control device.

FIG. 7 is a diagram showing a flowchart (No. 2) of the process executed by the control device.

(Step S21) The control unit 130 establishes a session between the command telephone set 11 and, the mobile station 31. Namely, the control unit 130 establishes an audio path. This enables the command telephone set 11 and the mobile station 31 to execute the voice communication via the base station 21.

(Step S22) The control, unit 130 executes a voice communication process. For example, in the voice communication process, the control unit 130 multicasts a voice signal to the base station 21 and the base station 22 since no branch point exists in the base station zone of the base station 21.

Here, the mobile station 31 is assumed to move into the base station zone of the base station 22. The mobile station 31 detects that the communication destination has changed from the base station 21 to the base station 22. The mobile station 31 transmits a continuation request to the control device 100.

(Step S23) The control unit 130 receives the continuation request, from the mobile station 31.

(Step S24) The control unit 130 cancels the closure of the second base station behind. For example, the control unit 130 cancels the closure of the base station 20.

(Step S25) The control unit 130 refers to the management table 112 and judges whether or not a branch point exists in the base station zone of the base station that is one base station behind. When no branch point exists in the base station zone, the control unit 130 advances the process to step S31. When a branch point exists in the base station zone, the control unit 130 advances the process to step S26.

For example, the control unit 130 refers to the management table 112 and judges that no branch point exists in the base station zone of the base station 21. The control unit 130 advances the process to the step S31.

(Step S26) The control unit 130 cancels the closure of a base station that did not undergo the handover. Then, the control unit 130 advances the process to the step S31.

Figure 8:
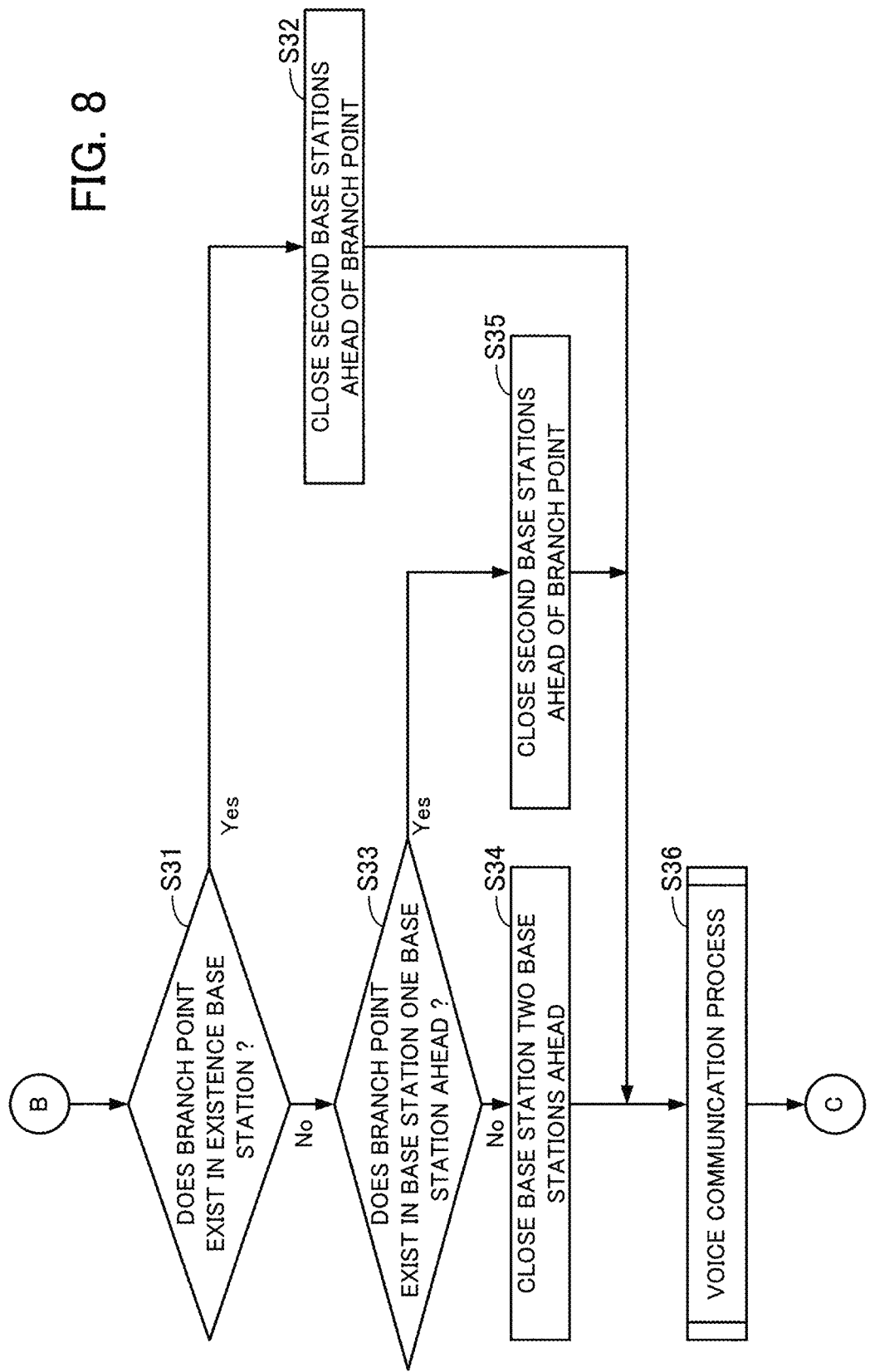
FIG. 8 is a diagram showing a flowchart (No, 3) of the process executed by the control device.

FIG. 8 is a diagram showing a flowchart (No. 3) of the process executed by the control device.

(Step S31) The control, unit 130 refers to the management table 112 and judges whether or not a branch point exists in the base station zone of the existence base station. When no branch point exists in the base station zone of the existence base station, the control unit 130 advances the process to step S33. When a branch point exists in the base station zone of the existence base station, the control unit 130 advances the process to step S32.

For example, the control unit 130 refers to the management table 112 and judges that a branch point 50 exists in the base station zone of the base station 22. The control unit 130 advances the process to the step S32.

(Step S32) The control unit 130 refers to the management table 112 and closes second base stations ahead of the branch point. The control unit 130 advances the process to step S36.

For example, the control unit 130 refers to the management table 112 and closes the base station 24 and the base station 27. Then, the control unit 130 advances the process to the step S36.

(Step S33) The control unit 130 refers to the management table 112 and judges whether or not a branch point exists in the base station zone of a base station that is one base station ahead. When no branch point exists in the base station zone, the control unit 130 advances the process to step S34. When a branch point exists in the base station zone, the control unit 130 advances the process to step S35.

(Step S34) The control unit 130 closes a base station that is two base stations ahead. Then, the control unit 130 advances the process to the step S36.

(Step S35) The control, unit 130 closes second base stations ahead of the branch point. Then, the control unit 130 advances the process to the step S36.

(Step S36) The control unit 130 executes the voice communication process. For example, in the voice communication process, the control unit 130 changes the transmission destination of the voice signal from the base station 21 to the base station 22. Since a branch point exists in the base station zone of the base station 22, the control unit 130 multicasts the voice signal to the base station 22, the base station 23 and the base station 26.

The control unit 130 advances the process to the step S23.

Figure 9:
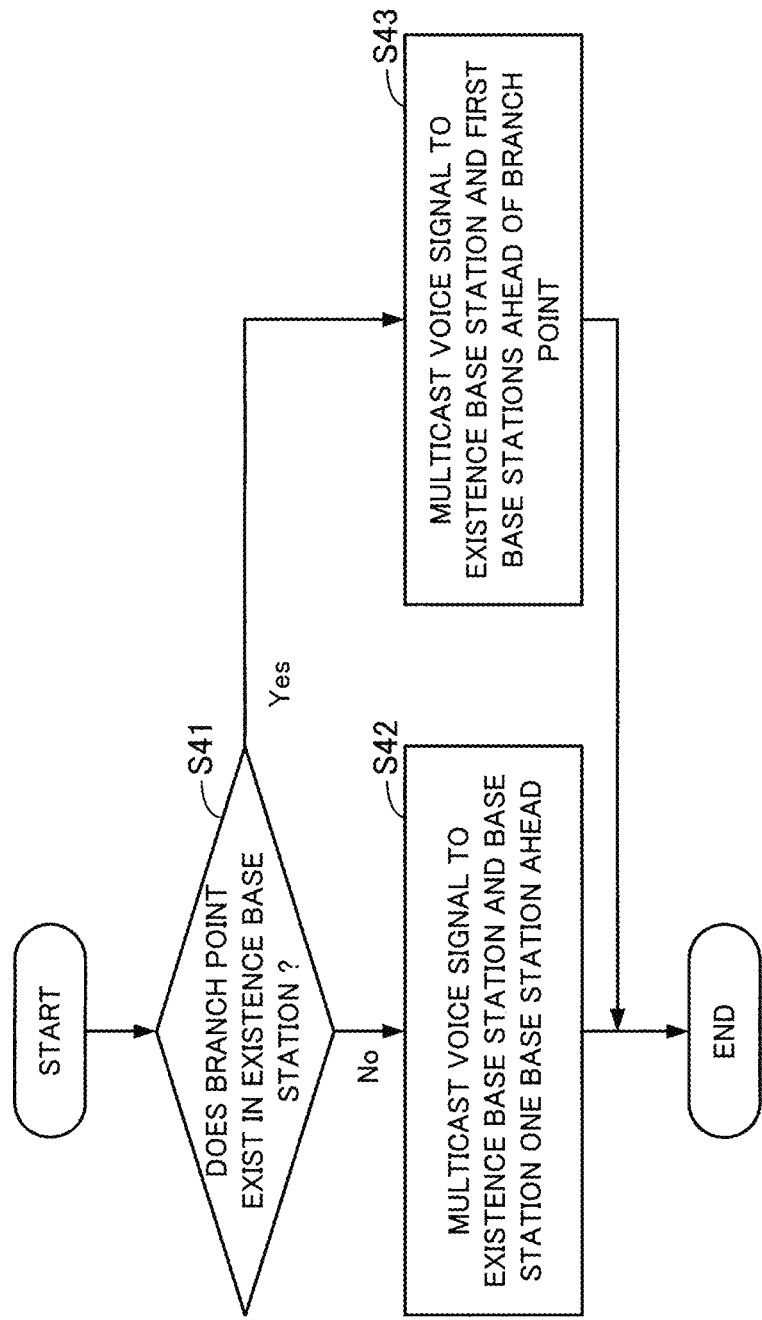
FIG. 9 is a diagram showing a flowchart of a voice communication process.

FIG. 9 is a diagram showing a flowchart of the voice communication process. The process of FIG. 9 corresponds to the step S22 and the step S36.

(Step S41) The control unit 130 refers to the management table 112 and judges whether or not a branch point exists in the base station zone of the existence base station. When no branch point exists in the base station zone, the control unit 130 advances the process to step S42. When a branch point exists in the base station zone, the control unit 130 advances the process to step S43.

(Step S42) The control unit 130 multicasts the voice signal to the existence base station and a base station that is one base station ahead of the existence base station.

(Step S43) The control unit 130 multicasts the voice signal to the existence base station and first base stations ahead of the branch point.

A case where the mobile station 31 has moved into the base station, zone of the base station 23 will be described below. The mobile station 31 detects that the communication destination has changed from the base station 22 to the base station 23. The mobile station 31 transmits a continuation request to the control device 100.

The control unit 130 receives the continuation request from the mobile station 31 (step S23). The control unit 130 cancels the closure of the base station 21 (step S24). The control unit 130 refers to the management table 112 and judges that a branch point exists in the base station zone of the base station 22 (Yes in the step S25). The control unit 130 cancels the closure of the base station 26 and the base station 27 (step S26).

The control unit 130 refers to the management, table 112 and judges that no branch point exists in the base station zone of the base station 23 (No in the step S31). The control unit 130 refers to the management table 112 and judges that no branch point exists in the base station zone of the base station 24 (No in the step 133). The control unit 130 closes the base station 25 (step S34). The control unit 130 changes the target of the transmission of the voice signal from the base station 22 to the base station 23 (step S36). This enables the command telephone set 11 and the mobile station 31 to execute the voice communication via the base station 23.

The control unit 130 refers to the management table 112 and judges that no branch point exists in the base station zone of the base station 23 (No in the step S41). The control unit 130 transmits the voice signal to the base station 23 and the base station 24 (step S42). Further, since the mobile station 31 did not move to the base station zone of the base station 26, that control unit 130 stops the transmission of the voice signal to the base station 26.

Next, processes executed in the communication system will be described below by using sequence diagrams.

Figure 10:
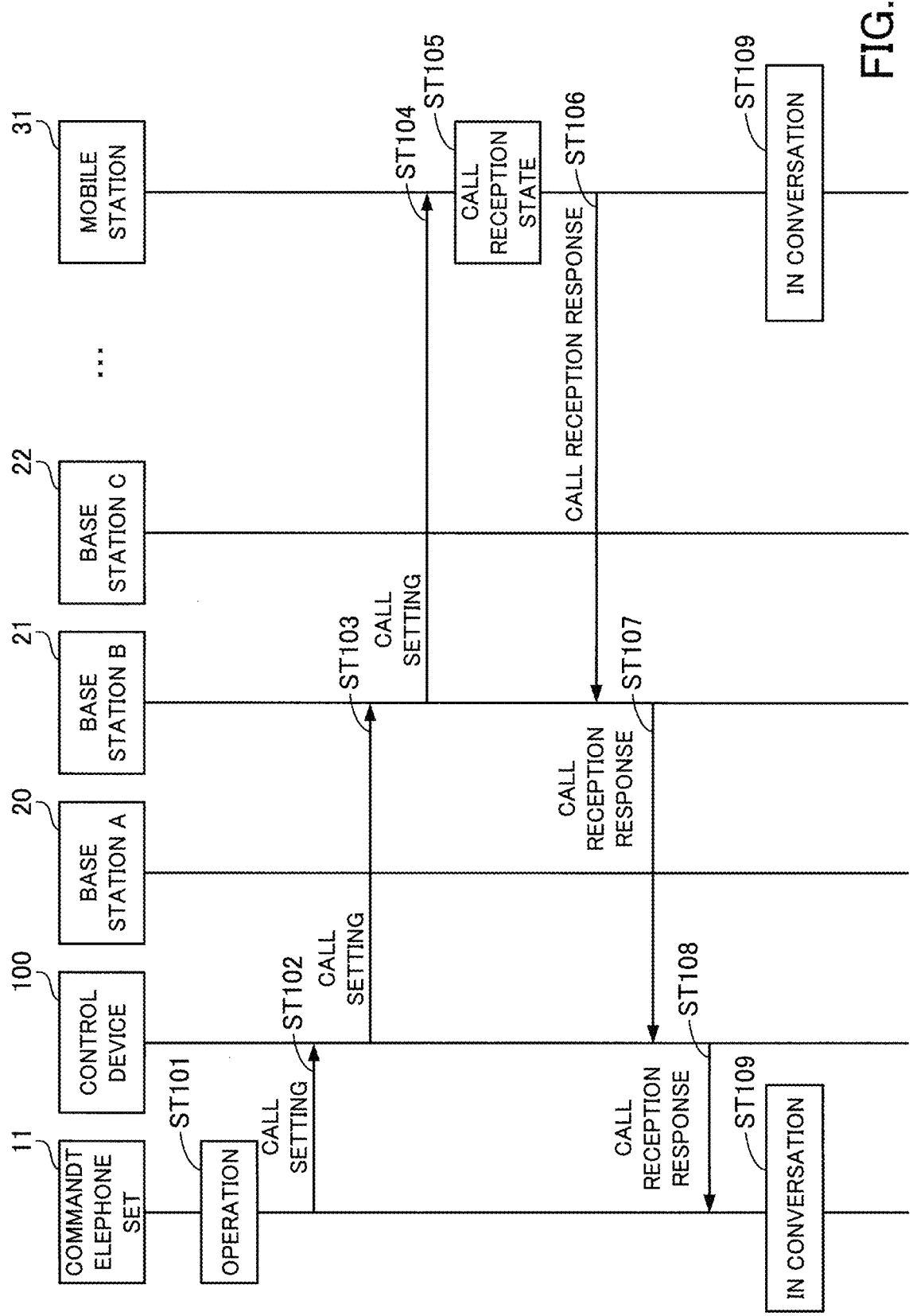
FIG. 10 is a sequence diagram (No, 1) showing an example of a process executed in the communication system.

FIG. 10 is a sequence diagram (No. 1) showing an example of a process executed in the communication system. In FIG. 10, some of the base stations are left out. At the time point of starting the process of FIG. 10, the mobile station 31 is assumed to exist in the base station zone of the base station 21.

(Step ST101) The command telephone set 11 receives an operation performed by the dispatcher.

(Step ST102) The command telephone set 11 makes a call setting.

(Step ST103) The control device 100 makes a call setting.

(Step ST104) The base station 21 makes a call setting.

(Step ST105) The mobile station 31 shifts to a call reception state.

(Step ST106) The mobile station 31 transmits a call reception response to the base station 21.

(Step ST107) The base station 21 transmits the call reception response to the control device 100.

(Step ST108) The control device 100 transmits the call reception response to the command telephone set 11.

This enables the command telephone set 11 and the mobile station 31 to execute the voice communication via the base station 21.

(Step ST109) The command telephone set 11 and the mobile station 31 shift to an in-conversation state.

Figure 11:
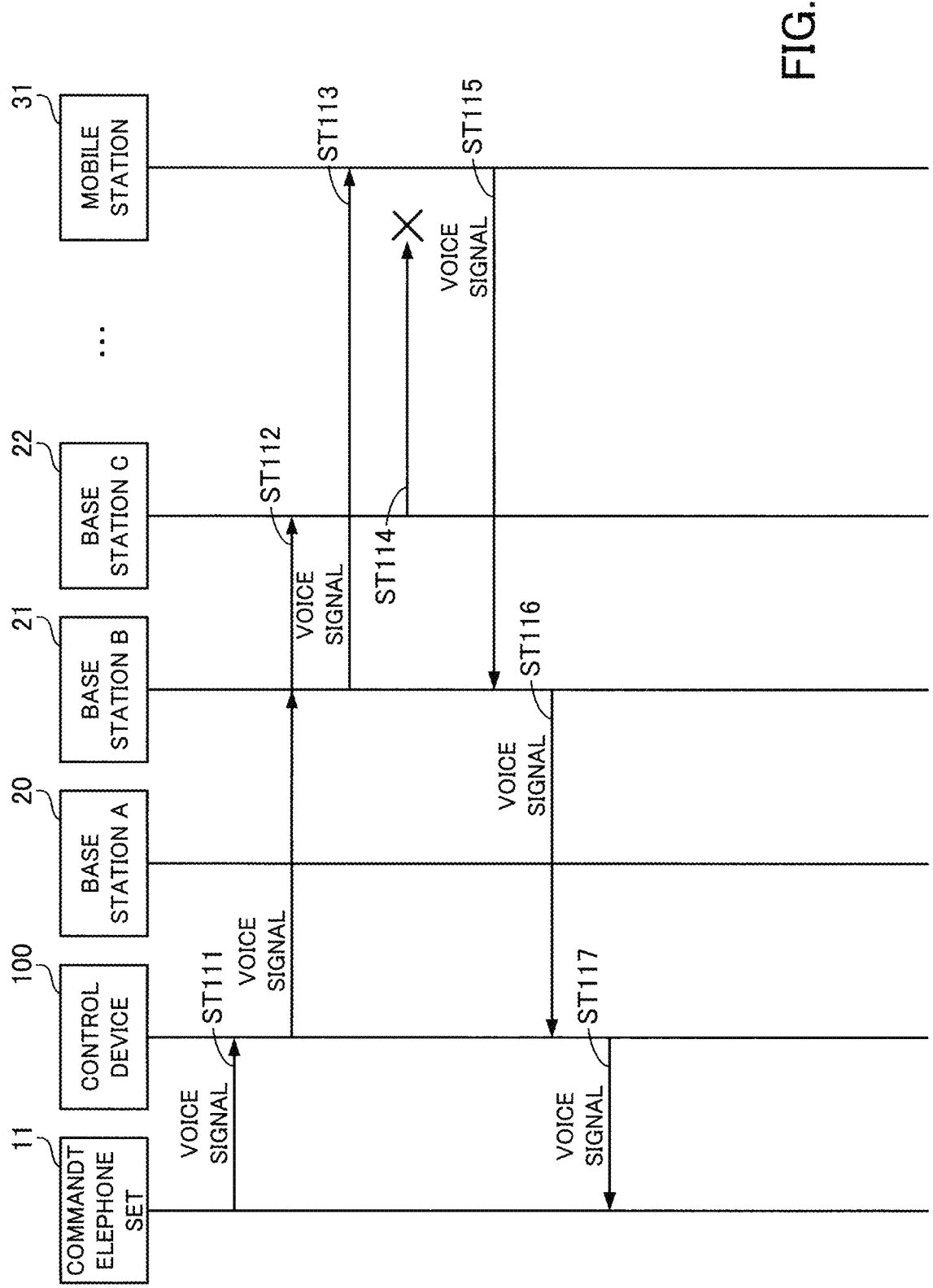
FIG. 11 is a sequence diagram (No. 2) showing an example of a process executed in the communication system.

FIG. 11 is a, sequence diagram (No. 2) showing an example of a process executed in the communication system. In FIG. 11, some of the base stations are left out.

(Step ST111) The command telephone set 11 transmits a voice signal to the control device 100.

(Step ST112) The control device 100 multicasts the voice signal to the base station 21 and the base station 22.

(Step ST113) The base station 21 transmits the voice signal to the mobile station 31.

(Step ST114) The base station 22 transmits the voice signal. The mobile station 31 does not receive the voice signal.

(Step ST115) The mobile station 31 transmits a, voice signal to the base station 21.

(Step ST116) The base station 21 transmits the voice signal to the control device 100.

(Step ST117) The control device 100 transmits the voice signal to the command telephone set 11.

FIG. 12 is a diagram (No. 1) showing conditions of the base stations. FIG. 12 indicates that the mobile station 31 exists in the base station zone of the base station B (i.e., the base station 21). Further, FIG. 12 indicates that the target of the multicast is the base station C (i.e., the base station 22). Namely, FIG. 12 indicates that the control device 100 multicasts the voice signal to the base station B and the base station C. Furthermore, FIG. 12 indicates that the base station A (i.e., the base station 20), the base station D (i.e., the base station 23) and the base station G (i.e., the base station 26) have been closed.

Figure 13:
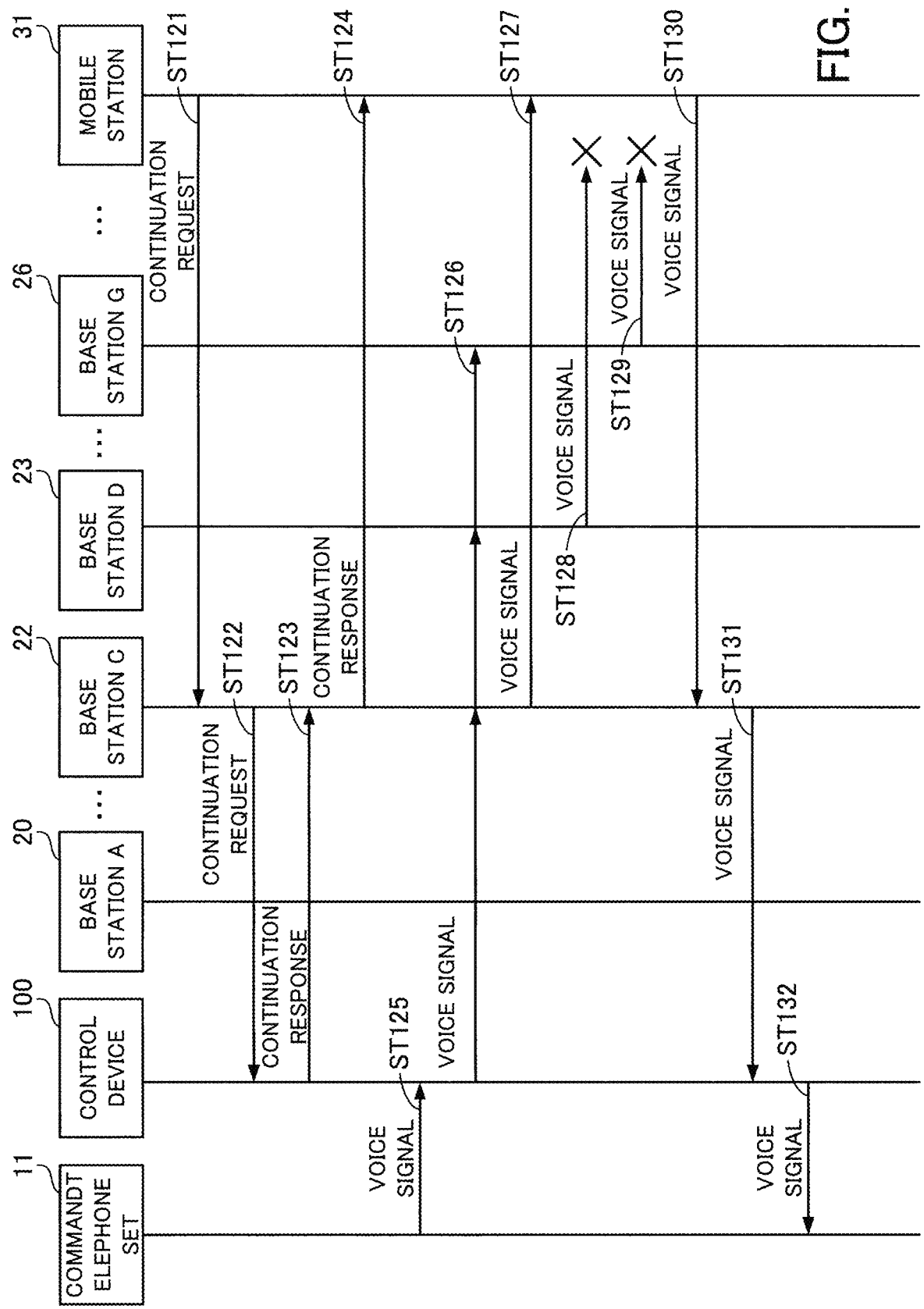
FIG. 13 is a sequence diagram (No. 3) showing an example of a process executed in the communication system.

FIG. 13 is a sequence diagram (No. 3) showing an example of a process executed in the communication system. In FIG. 13, some of the base stations are left out. At the time point of starting the process of FIG. 13, the mobile station 31 is assumed to move into the base station zone of the base station 22.

(Step ST121) The mobile station 31 transmits a continuation request to the base station 22.

(Step ST122) The base station 22 transmits the continuation request to the control device 100.

(Step ST123) The control device 100 transmits a continuation response to the base station 22.

(Step ST124) The base station 22 transmits the continuation request to the mobile station 31.

(Step ST125) The command telephone set 11 transmits a voice signal to the control device 100.

(Step ST126) The control device 100 multicasts the voice signal to the base station 22, the base station 23 and the base station 26.

(Step ST127) The base station 22 transmits the voice signal to the mobile station 31.

(Step ST128) The base station 23 transmits the voice signal. The mobile station 31 does not receive the voice signal.

(Step ST129) The base station 26 transmits the voice signal. The mobile station 31 does not receive the voice signal.

(Step ST130) The mobile station 31 transmits a voice signal to the base station 22.

(Step ST131) The base station 22 transmits the voice signal to the control device 100.

(Step ST132) The control device 100 transmits the voice signal to the command telephone set 11.

FIG. 14 is a diagram (No. 2) showing conditions of the base stations. FIG. 14 indicates that the mobile station 31 exists in the base station zone of the base station C (i.e., the base station 22). Further, FIG. 14 indicates that the targets of the multicast are the base station D (i.e., the base station 23) and the base station G (i.e., the base station 26). Namely, FIG. 14 indicates that the control device 100 multicasts the voice signal to the base station C, the base station D and the base station G. Furthermore, FIG. 14 indicates that the base station B (i.e., the base station 21), the base station E (i.e., the base station 24) and the base station H (i.e., the base station 27) have been closed.

As above, the control unit 130 reserves radio channels of one or more base stations existing ahead of the base stations D and G. Specifically, the control unit 130 reserves radio channels of one or more base stations existing one base station ahead of the base stations D and G. Accordingly, when the train 30 moves into the base station zone of the base station D, for example, a radio channel of the base station E has already been reserved, and thus the control unit 130 is capable of preventing the radio channel of the base station E from being used for different communication. Further, when the train 30 moves into the base station zone of the base station G, for example, a radio channel of the base station H has already been reserved, and thus the control unit 130 is capable of preventing the radio channel of the base station H from being used for different communication.

Figure 15:
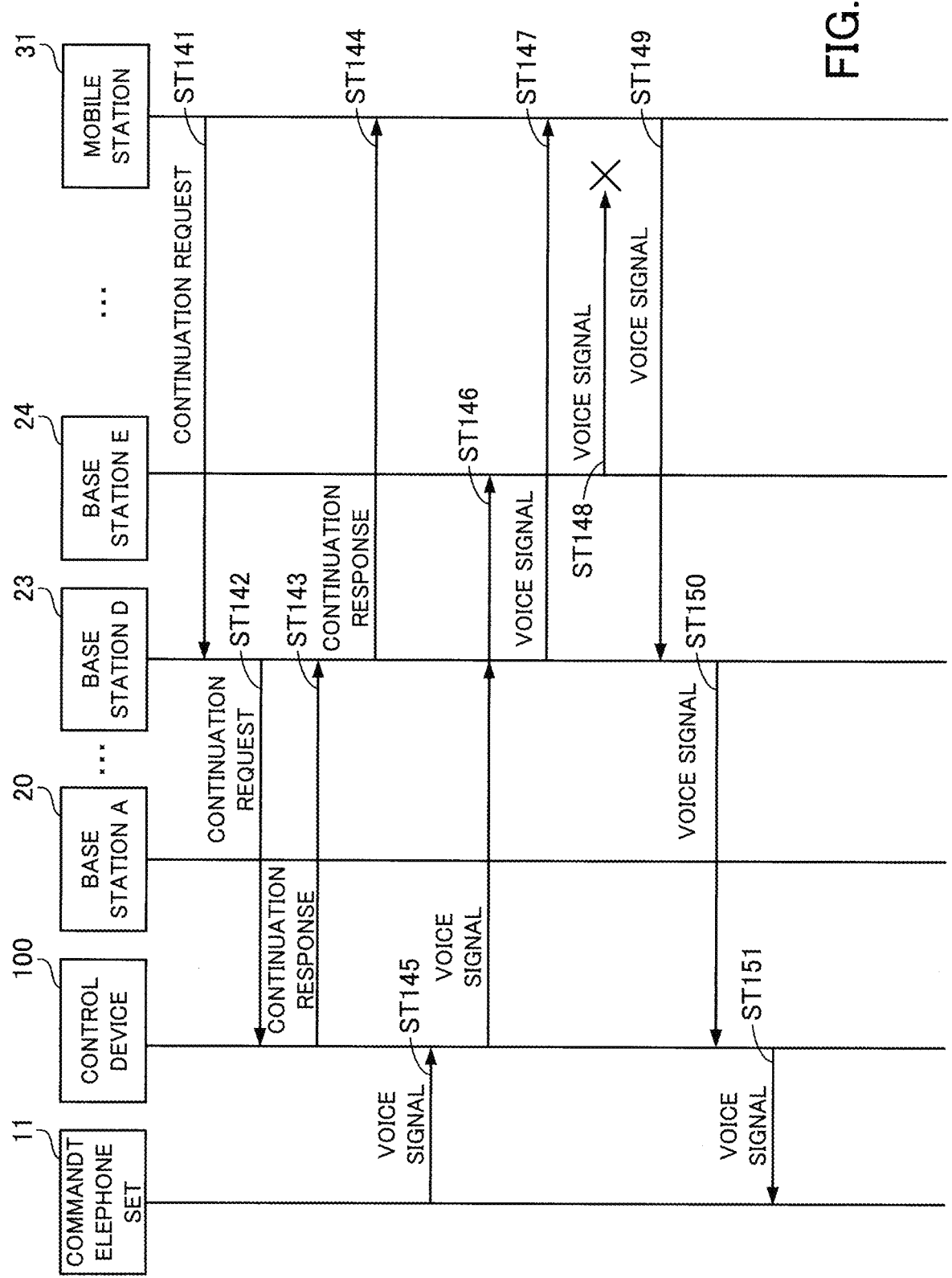
FIG. 15 is a sequence diagram (No. 4) showing an example of a process executed in the communication system.

FIG. 15 is a sequence diagram (No, 4) showing an example of a process executed in the communication system. In FIG. 15, some of the base stations are left out. At the time point of starting the process of FIG. 15, the mobile station 31 is assumed to move into the base station zone of the base station 23.

(Step ST141) The mobile station 31 transmits a continuation request to the base station 23.

(Step ST142) The base station 23 transmits the continuation request to the control device 100.

(Step ST143) The control device 100 transmits a continuation response to the base station 23.

(Step ST144) The base station 23 transmits the continuation response to the mobile station 31.

(Step ST145) The command telephone set 11 transmits a voice signal to the control device 100.

(Step ST146) The control device 100 multicasts the voice signal to the base station 23 and the base station 24.

(Step ST147) The base station 23 transmits the voice signal to the mobile station 31.

(Step ST148) The base station 24 transmits the voice signal. The mobile station 31 does not receive the voice signal.

(Step ST149) The mobile station 31 transmits a voice signal to the base station 23.

(Step ST150) The base station 23 transmits the voice signal to the control device 100.

(Step ST151) The control device 100 transmits the voice signal to the command telephone set 11.

Figure 16:
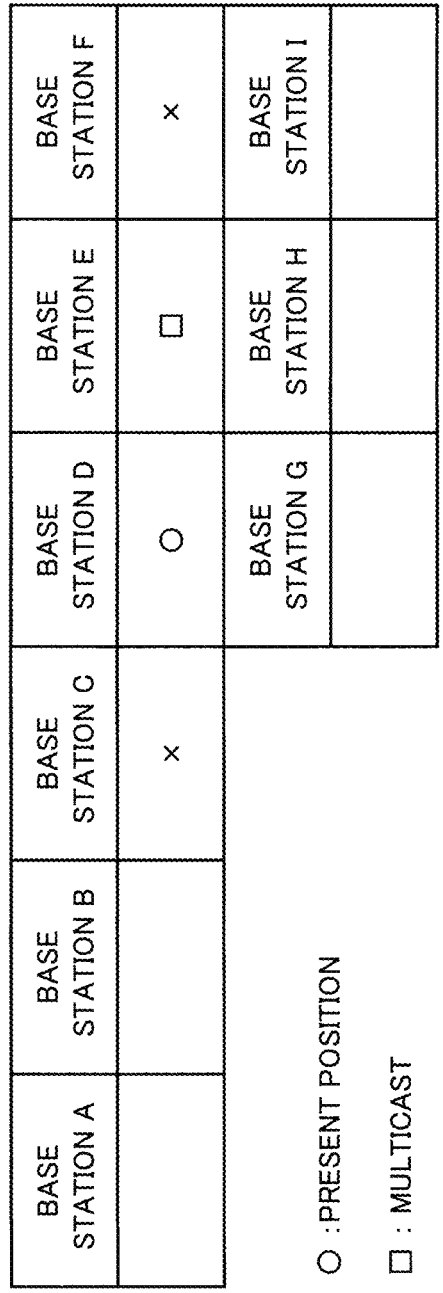
FIG. 16 is a diagram (No. 3) showing conditions of the base stations.

FIG. 16 is a diagram (No. 3) showing conditions of the base stations. FIG. 16 indicates that the mobile station 31 exists in the base station zone of the base station D (i.e., the base station 23). Further, FIG. 16 indicates that the target of the multicast is the base station E (i.e., the base station 24). Namely, FIG. 16 indicates that the control device 100 multicasts the voice signal to the base station 3 and the base station E. Furthermore, FIG. 16 indicates that the base station C (i.e., the base station 22) and the base station F (i.e., the base station 25) have been closed.

According to the embodiment, when a branch point exists in the base station zone in which the mobile station 31 exists, the control device 100 transmits the voice signal, to the base station 23 and the base station 26. Accordingly, the control device 100 is capable of shortening the time of the sound interruption even when the train 30 installed the mobile station 31 moves into the base station zone of the base station 23 or the base station zone of the base station 26.

DESCRIPTION OF REFERENCE CHARACTERS

10: central station, 11: command telephone set, 20-28: base station, 30: train, 31: mobile station, 40: network, 50: branch point, 100: control device, 101: processor, 102: volatile storage device, 103: nonvolatile storage device, 110: storage unit, 111: existence table, 112: management table, 120: acquisition unit, 130: control unit, 140: management unit.

What is claimed is:

1. A control device that communicates with a communication device installed in a train, existing in a first base station zone as a reception area of a signal transmitted from a first base station and traveling on a railroad, via the first base station, the control device comprising:
    an acquiring circuitry to acquire branch information indicating that a branch point on the railroad exists in the first base station zone and information indicating a plurality of base stations existing one base station ahead of the first base station; and
    a controlling circuitry to transmit a same voice signal to the first base station and the plurality of base stations when existence of the branch point in the first base station zone is detected based on the branch information.

2. The control device according to claim 1, wherein the controlling circuitry multicasts the same voice signal to the first base station and the plurality of base stations.

3. The control device according to claim 1, wherein the controlling circuitry reserves radio channels of one or more base stations existing ahead of the plurality of base stations.

4. A control method performed by a control device that communicates with a communication device installed in a train, existing in a first base station zone as a reception area of a signal transmitted from a first base station and traveling on a railroad, via the first base station, the control method comprising:
    acquiring branch information indicating that a branch point on the railroad exists in the first base station zone and information indicating a plurality of base stations existing one base station ahead of the first base station; and
    transmitting a same voice signal to the first base station and the plurality of base stations when existence of the branch point in the first base station zone is detected based on the branch information.

5. A control device that communicates with a communication device installed in a train, existing in a first base station zone as a reception area of a signal transmitted from a first base station and traveling on a railroad, via the first base station, the control device comprising:
    a processor to execute a program; and
    a memory to store the program which, when executed by the processor, performs processes of,
    acquiring branch information indicating that a branch point on the railroad exists in the first base station zone and information indicating a plurality of base stations existing one base station ahead of the first base station; and
    transmitting a same voice signal to the first base station and the plurality of base stations when existence of the branch point in the first base station zone is detected based on the branch information.

6. The control device according to claim 1, wherein the branch point on the railroad is configured to direct the railroad to any one of at least two of the plurality of base stations existing one base station ahead of the first base station.

* * * * *